United States Patent Office 3,242,168
Patented Mar. 22, 1966

3,242,168
ALKALOIDS FROM PLANTS OF THE GENUS FUNTUMIA
Jean Louis Paul Mainil, Watermael-Boitsfort, Belgium, assignor to Société Anonyme Oletta, Luxembourg, Luxembourg
No Drawing. Filed June 1, 1962, Ser. No. 199,265
Claims priority, application Belgium, June 2, 1961, 604,546; Nov. 24, 1961, 610,732
11 Claims. (Cl. 260—239.5)

My invention relates to new alkaloids and basic principles and to a process for the synthesis thereof.

In my copending application No. 8485 filed February 15, 1960, now U.S. Pat. 3,098,082, various novel alkaloids which are designated as alkaloids F, G, H, I and J, and which are obtained from plants of the genus Funtumia (Apocynaceae), have been described along with a showing of their utility.

Alkaloid F is dimethyl funtumafrine

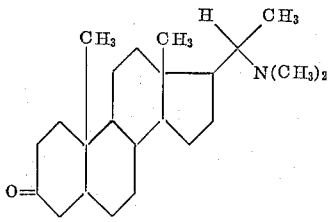

Molecular formula=$C_{22}H_{37}ON$
Infra-red spectra shows a carbonyl C=O at 1707 cm.$^{-1}$
M.P. 176° C.
$(\alpha)_D = +45°$ (CHCl$_3$, c.=1.8)

Alkaloid G is methyl funtuphyllamine.

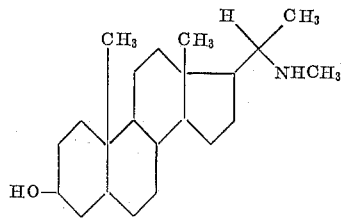

Formula: $C_{22}H_{39}ON$
M.P. 214° C.
$(\alpha)_D = +24°$ (CHCl$_2$, c.=0.6)
Infra-red spectrum: NH, OH bands in the regions of 3367 cm.$^{-1}$ and 3185 cm.$^{-1}$ Alkaloid H is funtuphyllamine.

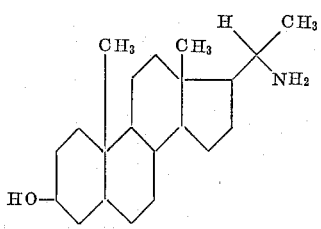

Formula: $C_{21}H_{37}ON$
$(\alpha)_D = +13°$ (CHCl$_3$, c.=1.3)
M.P. 173° C.

Infra-red spectrum: OH, NH$_2$ bands in the regions of 3226 cm.$^{-1}$ and 3378 cm.$^{-1}$ Alkaloid I is methyl funtumafrine

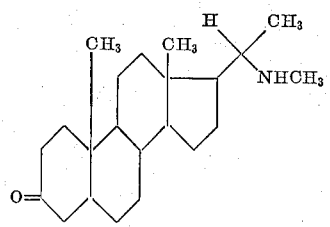

Formula: $C_{22}H_{39}ON$
M.P. 160° C.
$(\alpha)_D = +43°$ (CHCl$_3$, c.=1.3)
Infra-red spectrum: carbonyl C=O at 1706 cm.$^{-1}$ Alkaloid J is dimethyl funtuphyllamine.

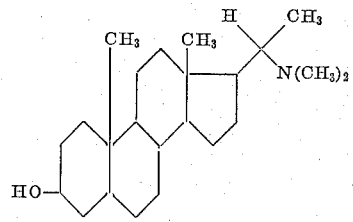

Formula: $C_{23}H_{41}ON$
M.P. 172° C.
$(\alpha)_D = +24°$ (CHCl$_3$, c.=1)
Infra-red spectrum: OH band at 330 cm.$^{-1}$ All these alkaloids are isolated from the species F. africana, F. latifolia and F. elastica and are extracted by the methods described in the aforementioned patent application. The following method is given by way of example.

Example A 1,000 grams of crushed leaves of Funtumia africana were percolated with 7,000 cc. of 2% acetic methanol. The solution obtained was evaporated in vacuo until 1,000 cc. were obtained. Water was then added in order to obtain an acetic methanol solution with an alcohol strength of 60° and the solution was left to stand for 12 hours.

The coagulate comprising chlorophyll, rubbers and triterpenes, especially ursolic acid and tannoids was filtered off. The filtrate was made alkaline with ammonia and treated with a solvent, example, 750 cc. of methylene chloride. The solvent was then evaporated and the bases obtained were stirred with a non-polar solvent, for example petroleum ether. Some of the bases thus passed into the solvent (petroleum ether) and the insoluble part was then purified as the oxalates.

The petroleum ether solution containing the soluble bases was evaporated and the bases thus obtained were re-dissolved in benzene or another appropriate solvent. The solution was passed through a chromatography column comprising alumina or silica or through an ion exchanger and eluted.

The eluants successively liberate:
(1) *Alkaloid F*—by elution with benzene.
(2) *Alkaloid I*—by elution with benzene+1% of ether.

(3) *Alkaloid J*—by elution with ether+2% of ethanol.
(4) *Alkaloid G*—by completion of the elution with ether+2% of ethanol.
(5) *Alkaloid H*—by elution with ether+10% of ethanol.

We have now found that a new alkaloid, alkaloid K, is obtained by an identical treatment of the trunk bark of *Funtumia latifolia* and is recovered by elution with 2% ethanol ether. We have also found that a further alkaloid, alkaloid L can be obtained by the above method if leaves of *Funtumia elastica* are treated. Alkaloid L is recovered from the column by elution with ether+10% of ethanol.

Alkaloid K is funtulatine.

Formula: $C_{23}H_{37}ON$
M.P. 135° C.
$(\alpha)_D = -4°$ (in $CHCl_3$, c.=0.8)
The acetylated derivative has a melting point of 160° C.;
$(\alpha)_D = -15°$
(c.=1.4 $CHCl_3$)
(Obtained from an extract of the bark of *Funtumia latifolia*).

Alkaloid L is irehine.

Formula: $C_{23}H_{39}ON$
M.P. 162–163° C.
Contains $N(CH_3)_2$
(Obtained from an extract of the leaves of *Funtumia elastica*).

The present invention also provides certain synthesis reactions for the preparation of Funtumia alkaloids. The following examples illustrate the invention:

*Example 1.—Synthesis of funtuphyllamine, alkaloid H, starting from 3-β-hydroxy-20-oxo(5α)-pregnane*

7.80 grams of hydroxylamine hydrochloride were dissolved in 200 ml. of methanol, 15 grams of sodium acetate were added thereto, the mixture was heated on a water bath for 15 minutes and filtered through cotton. 8 grams of 3-β-hydroxy-20-oxo-(5α)-pregnane were added to this filtrate and this was brought to boiling under reflux. After 2 hours, it was concentrated in vacuo to about 100 ml., transferred into a 1 litre decantation ampoule and 100 ml. of chloroform and 500 ml. of water were added. This mixture was agitated, the substance was decanted and the chloroform was recovered. It was re-extracted twice with 100 ml. of chloroform for each extraction. The three chloroform fractions were combined, washed with water (100 ml. of water on each occasion) and then dried over 50 g. of sodium sulphate. The solution was filtered, evaporated to dryness in vacuo on a water bath and there were obtained 8.4 grams of a white solid ketoxime product with a melting point 224° C.

*3-β-hydroxy-20α-amino-(5α)-pregnane.*—0.500 gram of platinum oxide and 50 ml. of acetic acid were introduced into a flask of a hydrogenation apparatus. After stirring for 2 hours in a hydrogen atmosphere, 3,023 grams of ketoxime, prepared as above, and dissolved in 150 ml. of acetic acid, were added and stirring in a hydrogen atmosphere was continued for 24 hours. (The hydrogen absorption became zero.) The reaction mixture was filtered through paper in order to separate the platinum, concentrated to dryness in vacuo on a water bath and 100 ml. of ether were added, followed by hydrochloric acid until a pH value of 2 was obtained. Filtering was carried out and the white precipitate formed was washed twice, using 50 ml. of ether on each occasion.

This precipitate which weighed 2.78 grams formed the hydrochlorides of 3β-hydroxy-20α- and 20β-amino-(5α)-pregnane. The ethers used for washing on evaporation to dryness yielded 0.767 gram.

By crystallization in methanol, the amine hydrochlorides gave a first quantity of 3β-hydroxy-20α-amino-(5α)-pregnane hydrochloride. 0.950 gram of hydrochloride was dissolved in methanol, made alkaline with sodium hydroxide and extracted with chloroform (3 times 50 ml.) after adding 200 ml. of water. The chloroformic extract was washed with water (3 times 50 ml.), dried over anhydrous sodium sulphate and evaporated to dryness in vacuo. There was obtained 0.824 g. of a white product, M.P. 169° C., which crystallized in methanol or in ethanol. By recrystallization, a melting point of 171° C. is obtained. $(\alpha)_D = +13°$ ($CHCl_3$, c.=1.3). Analysis $C_{21}H_{37}ON$.

This product had an infra-red spectrum identical with that of the alkaloid H, funtuphyllamine.

*Example 2.—Synthesis of methyl funtuphyllamine, alkaloid G*

*Formylation of 3β-hydroxy-20α-amino-(5α)-pregnane.*—3 ml. of acetic anhydride were added to 433 mg. of alkaloid H, dissolved in 10 ml. of 96% formic acid. The mixture was placed on a water bath at 60° C. for one hour, 100 ml. of water were added and it was extracted 3 times with ether. The ethereal extract, washed with water, dried over sodium sulphate and evaporated to dryness in vacuo, left a vitreous product weighing 453 mg.

*Reduction with lithium aluminium hydride of the diformyl derivative in tetrahydrofuren to give 3β-hydroxy-20α-methylamino-(5α)-pregnane.*—453 mg. of the diformylated derivative having the following structural formula:

$$\text{structural formula of diformyl derivative with HO-, CH}_3\text{, CH}_3\text{, C-H (C=O), CH}_3\text{, NH-C-H (C=O)}$$

were dissolved in 80 ml. of tetrahydrofuran. Thoroughly dry glass wool and 1.50 g. of lithium aluminium-hydride were introduced into the shell of a 60 ml. Soxhlet apparatus. Heating was carried out for 30 hours and the substance obtained was evaporated to dryness in vacuo. 50 ml. of moist ether and then ethyl acetate in small portions were introduced until effervescence ceased and, finally, water was added.

Acidification was carried out with twice-normal hydrochloric acid in order to dissolve the precipitate. 10 grams of sodium-potassium tartrate were added, the substance was made alkaline with ammonia and extracted 3 times with ether (100 ml., 50 ml. and 50 ml.).

The ethereal extract was washed, dried, and evaporated to dryness in the usual manner to leave 422 mg. of crude product. A first crystallization of the ethyl acetate yielded 152 mg. (M.P.=185° C.).

After being recrystallized four times from methanol, a product was obtained which had the following characteristics: M.P.=214° C. $(\alpha)_D$ +24° ($CHCl_3$, c.=0.6).

Infra-red spectrum in Nujol (registered trademark) could be superimposed on that of methyl funtuphyllamine (alkaloid G).

*Example 3.—Synthesis of dimethyl funtuphyllamine*

*Methylation of the alkaloid H by the Eschweiler reaction to give the alkaloid J.*—0.100 gram of alkaloid H was heated under reflux for 4 hours on a boiling water bath with 3 ml. of formic acid and 5 ml. of 40% formaldehyde. 50 ml. of water were added and the mixture was made alkaline with ammonia and extracted with ether (3 times 30 ml.). The ethereal extract was washed with water (2 times 30 ml.), dried over dry sodium sulphate, evaporated to dryness in vacuo on a water bath and the product thus obtained was directly treated with 10 ml. of normal methanolic soda at boiling point for 1 hour. The resulting mixture was concentrated in vacuo until dry and 50 ml. of ether and 50 ml. of water were added. The solution was stirred and the ethereal phase recovered. Extraction was then carried out twice, with 20 ml. of ether on each occasion.

The ethereal phases were recombined, washed 3 times with water (30 ml. on each occasion), dried over sodium sulphate and evaporated to dryness in vacuo on a water bath. A crude product weighing 0.101 g. was obtained.

A first crystallization in acetone gave 70 mg., M.P. 159° C. Two successive recrystallizations, followed by a sublimation at 140° C. under 0.01 mm. Hg, produced a white sublimate weighing 42 mg., M.P. 171° C., $(\alpha)_D = +24° \pm 1°$ (CHCl$_3$, c.=1.6).

ALKALOID J

*Example 4.—Synthesis of methyl funtumafrine*

Chromic oxidation of 3β-hydroxy-20α-methylamino-(5α)pregnane of the synthesis=3oxo-20α-methylamino-(5α)-pregnane.—125 mg. of 3β-hydroxy-20α-methylamino-(5α)-pregnane were dissolved in 10 ml. of acetic acid and a hydroacetic solution of CrO$_3$ was added dropwise thereto (40 mg. in 0.5 ml. of water and 2 ml. of acetic acid: 1 mol+10% of CrO$_3$).

The precipitate which formed was redissolved by addition of a few drops of water and by stirring. After contact for 20 hours at the temperature of the laboratory, 1 ml. of methanol was added to destroy the chromic acid excess, and it was then left for 1 hour and poured onto crushed ice. 20 ml. of water were added and the mixture was made alkaline with ammonia and extracted 3 times with ether. The ethereal extract was washed with water, dried and distilled in vacuo in the usual manner to leave a solid white product weighing 115 mg. By recrystallization from acetone, it yielded 80 mg. (M.P.=160° C.)—$(\alpha)_D$ +43° (CHCl$_3$, c.=1.3)—alkaloid I. The infra-red spectrum was identical with that of methyl funtumafrine.

*Example 5.—Synthesis of dimethyl funtumafrine*

The procedure was similar to that used in Example 4 but starting from the alkaloid J.

The product obtained had the properties of alkaloid F.

*Example 6.—Synthesis of funtuphyllamine*

*Acetylation of pregnenolone.*—30 grams of pregnenolone and 60 ml. of acetic anhydride were heated for 1 hour to the boiling point. After cooling, the acetylated derivative crystallized. It was centrifuged, washed with methanol and recrystallized from methanol to yield acetyl pregnenolone having a melting point of 149° C.

*Hydrogenation of acetyl pregnenolone: 3β-acetoxy-20-oxo-5α-pregnane.*—25 grams of acetyl pregnenolone prepared as above were dissolved in 850 ml. of acetic acid and stirred in a cold hydrogen atmosphere in the presence of 5 g. of 15% palladised carbon. 1680 ml. of hydrogen were absorbed. The acetic acid solution was filtered through cotton and evaporated to dryness in vacuo. The residue was recrystallized from methanol. A first batch of 16 grams of 3β-acetoxy-20-oxo-5α-pregnane having a melting point of 145° C. (theoretical 144.5° C.) were obtained.

*Oximation of 3β-acetoxy-20-oxo-5α-pregnane to give 3β-acetoxy-20-oximo - 5α - pregnane.*—16 grams of 3β-acetoxy-20-oxo-5α-pregnane were dissolved in 32 ml. of pyridine and 4 grams of hydroxylamine hydrochloride were added. The solution became cloudy and 68 ml. of pyridine were added to dissolve the precipitate. After contact for 24 hours in the cold atmosphere, a mixture was diluted with water and extracted with ether. After having driven off the pyridine, 16.3 g. of oxime having the melting point of 197° C. were obtained.

*Reduction of 3β-acetoxy-20-oximo-5α-pregnane to give 3β-hydroxy-20α-amino-5α-pregnane.*—16 grams of oxime were dissolved while heating in 200 ml. of acetic acid. After adding 1 gram of Adams platinum oxide, the mixture was stirred in a hydrogen atmosphere. 1900 ml. of hydrogen were absorbed. The acetic acid solution was decanted and distilled to dryness in vacuo.

*Saponification.*—The residue was dissolved in 200 ml. of 10% methanolic KOH and boiled under reflux for 1 hour. After concentration, 3β-hydroxy-20α-amino-5α-pregnane crystallized out. The crystals were centrifuged and washed with water. They were transformed into the hydrochloride, which crystallized from methanol. The 3β-hydroxy-20α-amino-5α-pregnane hydrochloride was centrifuged and washed with ether. A first batch of 7.487 grams were obtained, the infra-red spectrum of which was identical with that of the hydrochloride of funtuphyllamine.

*Preparation of the base.*—9.168 grams of 3β-hydroxy-20α-amino-5α-pregnane hydrochloride were dissolved in the minimum quantity of ethanol. Dilution with water was carried out and the mixture was made alkaline with sodium hydroxide in the presence of methylene chloride. Extraction was carried out 3 times with methylene chloride. The methylene chloride was washed with water, dried over Na$_2$SO$_4$ and distilled. 8.153 g. of base were obtained.

*Example 7.—Synthesis of dimethyl funtuphyllamine*

Dimethylation according to Eschweiler-Clarke of the 3β-hydroxy-20α-amino-5α-pregnane to give 3β-hydroxy-20α - dimethylamino - 5α - pregnane.—8 grams of 3β-hydroxy-20α-amino-5α-pregnane were heated under reflux for 4 hours on a water bath with 120 ml. formaldehyde and 120 ml. of formic acid. After this period of time had elapsed, the mixture was poured onto crushed ice in a decantation vessel, diluted with water and extracted 3 times with methylene chloride. The latter was washed with water, dried over Na$_2$SO$_4$ and evaporated to dryness. The residue was saponified by boiling for one hour in the presence of 200 ml. of twice-normal methanolic KOH. After dilution with water, extraction with methylene chloride was carried out. The extract was washed but not dried (very low solubility of the product), and is evaporated to dryness. The residue was recrystallized from methanol in order to give a first batch of 6 g. of 3β-hydroxy-20α-dimethylamino - 5α - pregnane having a melting point of 172° C. and the infra-red spectrum of which was identical with that of natural dimethyl funtuphyllamine, and of which the mixed melting point with dimethyl funtuphyllamine did not show any modification. The second batch of 1.122 g. had a melting point of 167° C.

*Example 8.—Synthesis of dimethyl funtumafrine*

*Chromic oxidation of 3β-hydroxy-20α-dimethylamino-5α-pregnane.*—5.900 grams of 3β-hydroxy-20α-dimethylamino-5α-pregnane were dissolved in 200 ml. of acetic acid. While stirring, 2.50 g. of CrO$_3$ in aqueous acetic solution (10 m CH$_3$COOH 2 ml. water) were gradually added. The precipitate formed was dissolved in the minimum amount of water. After contact for 24 hours at the temperature of the laboratory, the excess of CrO$_3$ was destroyed with methanol.

The mixture was diluted with water, made alkaline with ammonia in the presence of ice and methylene chloride and extracted 3 times with methylene chloride. This methylene chloride was washed with water, dried over Na$_2$SO$_4$ and distilled. 5.300 grams of white residue were obtained and this was recrystallized from methanol to give a first batch of 3.777 grams, with a melting point 172–173° C. and having an infra-red spectrum which was identical with that of natural dimethyl funtumafrine. A second batch of 0.700 g. with a melting point of 158° C. was again crystallized in methanol.

*Example 9.—Synthesis of malouetine: 3β-amino-20α-dimethylamino-5α-pregnane*

*Oximation of 3-oxo-20α-dimethylamino-5α-pregnane to give 3-oximo-20α-dimethylamino-5α-pregnane.*—2 grams of hydroxylamine hydrochloride and 2 g. of sodium acetate in solution in 100 ml. of methanol were boiled under reflux. A precipitate of NaCl was formed. The precipitate was separated and the hydroxylamine acetate solution was treated with 2 grams of 3-oxo-20α-dimethylamino-5α-pregnane. The mixture was left to boil under reflux for 4 hours. After this time, the mixture was diluted, made alkaline with ammonia and extracted with methylene chloride. This methylene chloride was washed with water, dried over $Na_2SO_4$ and distilled. There were obtained 2.100 grams of white residue, which was crystallized in methanol, this giving a first batch of 1.260 grams with a melting point 233–235° C. and a second batch with a melting point of 223° C.

*Reduction of the 3-oximo-20α-dimethylamino-5α-pregnane to 3β-amino - 20α - dimethylamino-5α-pregnane.*—1.040 grams of oxime were dissolved in 100 ml. of absolute ethanol (redistilled on Na). The reaction mixture was brought to boiling on an oil bath and 10 g. of metallic sodium were added in 1 hour. Boiling was allowed to continue for 1 hour after completing the addition of sodium. The excess sodium was destroyed with ethanol at 95° C., the mixture was then diluted with water and extracted with methylene chloride. The extracts were washed and dried and then distilled. 910 mg. of white product are obtained, 100 mg. of which were sublimed and purified to the dihydrochloride state, the infra-red spectrum of which showed the characteristic $NH_3$ bands.

Analysis for $C_{23}H_{44}N_2Cl_2$.—Calculated: Percent C, 65.84; H, 10.57; N, 6.67; Cl, 16.90. Found: Percent C, 65.53; H, 10.50; N, 6.72; Cl, 16.69.

The base was prepared from the hydrochloride and there was obtained 3β-amino-20α-dimethylamino-5α-pregnone having the melting point 148° C. and $(\alpha)_D$:

*Dimethylation according to Eschweiler and Clarke of the 3β-amino-20α-dimethylamino-5α-pregnane to give: bis-3β-20α-dimethylamino-5α-pregnane.*—910 mg. of 3β-amino-20α-dimethylamino-5α-pregnane were heated for 4 hours on a boiling water bath with 15 ml. of formaldehyde and 15 ml. of formic acid. After cooling, the mixture was transferred to a decantation vessel, diluted with water and made alkaline with $NH_4OH$ in the presence of ice and methylene chloride. Extraction was carried out with methylene chloride, which is washed and dried and then distilled. 1 gram of residue was obtained and was subjected to chromatography on alumina. After 2 chromatographic operations, there were obtained 644 mg. of bis-3β-20α-dimethylamino-5α-pregnane having a melting point 111–112° C. and $(\alpha)_D$ +25±($CHCl_3$, c.=2), these constants being in conformity with those given by Sorm.

It was very soluble in $CH_2Cl_2$, sparingly soluble in methanol, and crystallized in acetone into small colourless prisms.

Analysis for $C_{25}H_{46}N_2$.—Calculated: Percent C, 80.14; H, 12.37; N, 7.47. Found: Percent C, 79.98; H, 12.18; N, 733.

There were also separated 77 mg. of a product having the melting point 153° C. This compound was probably the bis-3α-20α-dimethylamino-5α-pregnane.

*Iodomethylation of bis-3β-20α-methylamino-5α-pregnane to give derivatives of bis-3β-20α-dimethylammonium-5α-pregnane.*—210 mg. of bis-3β-20α-dimethylamino-5α-pregnane were heated on a water bath with 5 ml. of methanol and 5 ml. of methyl iodide. After this period of time, the mixture was evaporated to dryness and there were obtained 370 mg. of slightly yellow residue. This was washed with ether, dissolved in methanol and passed over an IRA 410 resin in $Cl^-$ phase mounted in $CH_3OH$. The methanolic solution obtained was filtered after concentration on 3 grams of neutralized alumina (HCl). The chloride solution was evaporated to dryness. 270 mg. of white residue were obtained which, after being dissolved in the minimum amount of methanol, was precipitated by adding acetone.

*Picrate.*—100 mg. of the chloride were dissolved in distilled water and a saturated aqueous solution of picric acid was added until completion of precipitation. The precipitate was centrifuged and recrystallized from methanol.

Yellow needles were obtained which were soluble in acetone and could be crystallized in methanol, the melting point being 258° C. A mixed melting point with the malouetine picrate (M.P. 260–264° C.) showed no lowering. The infra-red spectrum of this picrate could be superimposed on that of the malouetine picrate.

Analysis for $C_{39}H_{56}O_{14}N_8$.—Calculated: Percent C, 54.41; H, 6.55; N, 13.01. Found: Percent C, 54.27; H, 6.72; N, 12.78.

*Example 10*

Different derivatives of funtulatine have been obtained including

O=acetyl funtulatine $C_{24}H_{37}O_2N$—M.P. 160° C.
Dihydrofuntulatine $C_{22}H_{37}ON$—M.P. 170° C.
Acetyl dihydrofuntulatine $C_{24}H_{39}O_2N$—M.P. 169° C.

It was concluded that funtulatine was 3β-hydroxycon-5-enine:

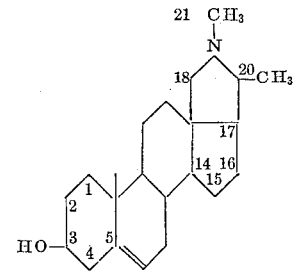

Starting from funtulatine, it was possible to carry out the following synthesis, passing through the following phases:

(a) *Iodomethylation of funtulatine.*—100 mg. of funtulatine were dissolved in 3 ml. of methanol and 2 ml. of methyl iodide and boiled under reflux for 2 hours. The quaternary salt obtained was precipitated by adding ether. It was centrifuged and a yellowish precipitate was obtained.

(b) *Formation of funtulatinium hydroxide from funtulatinium iodide.*—The funtulatinium iodide was dissolved in 5 ml. of methanol and this solution was passed over an IRA 410 resin column in $OH^-$ phase. The resin column was rinsed until neutral with methanol. The methanolic solution was evaporated to dryness and 102 mg. were obtained.

(c) *Pyrolysis of the funtulatinium hydroxide to give: 3β-hydroxy-18-dimethylamino-pregna-5,20-diene.* — The funtulatinium hydroxide was introduced into a sublimation tube and subjected to pyrolysis under an initial vacuum of 0.01 mm. Hg at 140° C. A white sublimate was obtained, which was recrystallized from methanol. M.P. 142° C.

Analysis for $C_{23}H_{37}ON$.—Calculated in percent: C, 80.41; H, 10.86; N, 4.08. Found in percent: C, 80.21; H, 10.68; N, 4.33.

*Example 11*

The synthesis of the funtulatine was carried out in the following manner:

(a) Starting from conessine, a plentiful and known starting material, isoconessimine is obtained by the Von Braun reaction.

The isoconessimine was deaminated by the known technique to yield N-chlorosuccinimide and produced the con- 4-ene-3-one, which was converted to the 3-acetoxy-cona-3,5-diene by the following method:

1.6 g. of the con-4-ene-3-one were dissolved in 4 ml. of acetic anhydride and 6 ml. of acetyl chloride and heated in a nitrogen atmosphere on an oil bath at 95–105° C. for 2 hours. The solvent was evaporated under reduced pressure and a residue weighing 1.70 g. was obtained.

(b) Reduction of the enol acetate of the conanene with sodium borohydride yielded the 3β-hydroxy-con-5-enine or funtulatine in accordance with the following process:

1.70 grams of the enol acetate were dissolved in 200 ml. of alcohol at 95° C. After cooling to 5° C. the mixture is added to a solution of 4 grams of sodium borohydride in 100 ml. of alcohol at 70° C. which had been cooled to 5° C. The addition was made over a period of 2 hours and the mixture was then brought to boiling point and 100 ml. of 5% sodium hydroxide solution added. Concentration in vacuo was carried out in order to drive off the alcohol, and then the mixture was diluted with water, extracted with ether and there were obtained 1.56 grams of yellowish spongy product which, by chromatography, gave funtulatine.

*Example 12.—Extraction of funtulatine (principle K)*

1000 grams of finely crushed trunk bark of *Funtumia latifolia* were percolated with 7000 cc. of 2% acetic methanol and then vacuum distilled to 1000 cc.

These 1000 cc. were diluted with water in order to obtain an alcoholic strength of 60° and left to stand for 12 hours, the coagulate formed then being filtered.

The filtrate is made alkaline with ammonia and extracted with a solvent, for example, $CH_2Cl_2$, 5 times each time with 150 cc.

The methylene chloride solution containing the alkaloid bases was distilled to dryness, taken up in ether and fixed on a standardised alumina column.

The funtulatine was extracted with ether containing 2% of methanol.

The principle L or irehine was obtained by the methods already described in application No. 8,485 for isolating the alkaloids of the leaves of *Funtumia latifolia* and *Funtumia elastica*, but using the dried and crushed leaves of *Funtumia elastica*.

All the bases obtained were subjected to chromatography on alumina and the irehine was extracted with the ether phase+10% of methanol.

What I claim is:

1. A process for obtaining funtulatine, which comprises extracting bark of *Funtumia latifolia* with an organic solvent, purifying the extract and separating funtulatine chromatographically using ether with 2% of ethanol as eluent.

2. A process for obtaining irehine, which comprises extracting leaves of *Funtumia elastica* with an organic solvent, purifying the extract and separating irehine chromatographically using ether with 10% of ethanol as eluent.

3. A process for the extraction of funtulatine 3β-hydroxy-con-5-enine which comprises percolating finely crushed bark of *Funtumia latifolia* with acetic methanol, reducing the volume of the solution, diluting with water and allowing to stand, filtering, coagulating the filtrate, making alkaline with ammonia, extracting with $CH_2Cl_2$, after which the solution containing the alkaloid bases is distilled to dryness, taken up in either and fixed on a standardised alumina column and the funtulatine is extracted with ether containing 2% of methanol.

4. A process for the extraction of irehine, as claimed in claim 2, wherein dried and crushed leaves of *Funtumia elastica* are extracted, and wherein all of the bases obtained are subjected to chromatography on alumina and the irehine is extracted by the phase ether+10% of methanol.

5. A process for the preparation of funtuphyllamine comprising reacting 3β-hydroxy-20-oxo-(5α)-pregnane with the filtrate of a mixture of hydroxylamine hydrochloride, methanol and sodium acetate to form the ketoxime 3β-hydroxy-20-ketoximo-5α-pregnane, hydrogenating the ketoxime by dissolving the same in acetic acid and stirring in a hydrogen atmosphere to obtain a salt of 3β-hydroxy-20α and 20β-amino(5α)-pregnane and separating the 20α derivative by crystallization in methanol.

6. A process for the preparation of methyl funtuphyllamine comprising formylating 3β-hydroxy-20α-amino-(5α)-pregnane by reacting the same with formic acid and reducing the thus obtained diformyl derivative by reacting the same with $AlLiH_4$ in tetrahydrofuran to produce methyl funtuphyllamine.

7. A process for the preparation of dimethyl funtuphyllamine comprising methylating funtuphyllamine by heating the latter in a water bath with formic acid and formaldehyde, alkalinating the mixture with ammonia, extracting an extract with ether, treating the extract with methanolic soda to form a mixture, adding ether to the latter mixture, separating an ethereal phase and crystallizing in acetone to produce dimethyl funtuphyllamine.

8. A process for the synthesis of funtuphyllamine which comprises acetylating pregnenolone by reacting the same with acetic anhydride; hydrogenating the thus formed acetyl pregnenolone by dissolving the same in acetic acid and stirring in a hydrogen atmosphere, forming the oxime of the thus obtained 3β-acetoxy-20-oxo-5α-pregnane by reacting the latter with hydroxylamine hydrochloride, reducing the oxime to 3β-hydroxy-20α-amino-5α-pregnane by dissolving the oxime in acetic acid and heating and thereafter stirring in a hydrogen atmosphere, and thereafter saponifying the product by reacting the same with a methanolic alkali.

9. In a process for the preparation of funtulatine which comprises reacting con-4-ene-3-one in acetic anhydride and acetyl chloride at temperatures of 95–105° under a nitrogen atmosphere on an oil bath for 2 hours and evaporating the solvent under reduced pressure to form 3-acetoxycono-3,5-diene, and reducing the latter with sodium borohydride to obtain funtulatine.

10. A process for the preparation of malouetine picrate comprising forming the oxime of 3-oxo-20α-dimethyl-amino-5α-pregnane by reacting the latter with a hydroxylamine acetate solution, reducing the oxime to yield 3β-amino-20α-dimethylamine-5α-pregnane by reacting the oxime with sodium, dimethylating the thus reduced oxime by heating the same with formaldehyde and formic acid to produce bis-3β-20α-dimethylamino-5α-pregnane, heating the latter with methanol and methyl iodide to iodomethylate the bis-3β-20α-dimethylamino-5α-pregnane to produce bis-3β-20α-dimethylammonium-5α-pregnane and adding picric acid to the latter to form malouetine picrate.

11. A process for the preparation of: 3β-hydroxy-18-dimethylamino-pregna-5,20-diene, which comprises iodomethylating funtulatine by boiling a solution of the latter with methanol and methyl iodide to obtain funtulatinium iodide, forming the hydroxide of the thus obtained funtulatinium iodide by ion exchange and pyrolyzing the thus obtained funtulatininum hydroxide.

References Cited by the Examiner

UNITED STATES PATENTS 2,913,455 11/1959 Pappo _____ 260—239.5
3,152,120 10/1964 Georgian et al. _____ 260—239.5

OTHER REFERENCES

Janot et al., "Compt. Rend. Acad. Sci.," Feb. 12, 1962, pages 1326–1328 relied on.

LEWIS GOTTS, *Primary Examiner.*

E. ROBERTS, *Assistant Examiner.*